United States Patent [19]

Chirico

[11] 4,077,786

[45] Mar. 7, 1978

[54] LIQUID-GAS SEPARATION APPARATUS

[75] Inventor: Anthony Nicholas Chirico, Short Hills, N.J.

[73] Assignee: Ecodyne Corporation, Lincolnshire, Ill.

[21] Appl. No.: 774,840

[22] Filed: Mar. 7, 1977

[51] Int. Cl.² .......................................... B01D 19/00
[52] U.S. Cl. .................................................. 55/185
[58] Field of Search ............ 13/9; 55/36, 52, 183–188; 203/10, 11, 40

[56] References Cited

U.S. PATENT DOCUMENTS

| 2,598,684 | 6/1952 | Goldblatt et al. | 203/40 |
| 2,606,016 | 8/1952 | Lindh et al. | 13/9 X |
| 2,777,533 | 1/1957 | Segrest | 55/185 |
| 2,881,116 | 4/1959 | Siegfried | 203/11 |
| 3,480,515 | 11/1969 | Goeldner | 203/10 |
| 3,604,376 | 9/1971 | Meyer et al. | 13/9 X |

Primary Examiner—Charles N. Hart
Assistant Examiner—Robert H. Spitzer
Attorney, Agent, or Firm—Joel E. Siegel; Charles M. Kaplan

[57] ABSTRACT

A vertical cylindrical liquid-gas separator of an evaporator is connected to horizontal cylindrical piping by a rectangular gas discharge conduit that promotes optimum gas flow characteristics through the separator.

7 Claims, 3 Drawing Figures

U.S. Patent  March 7, 1978  4,077,786
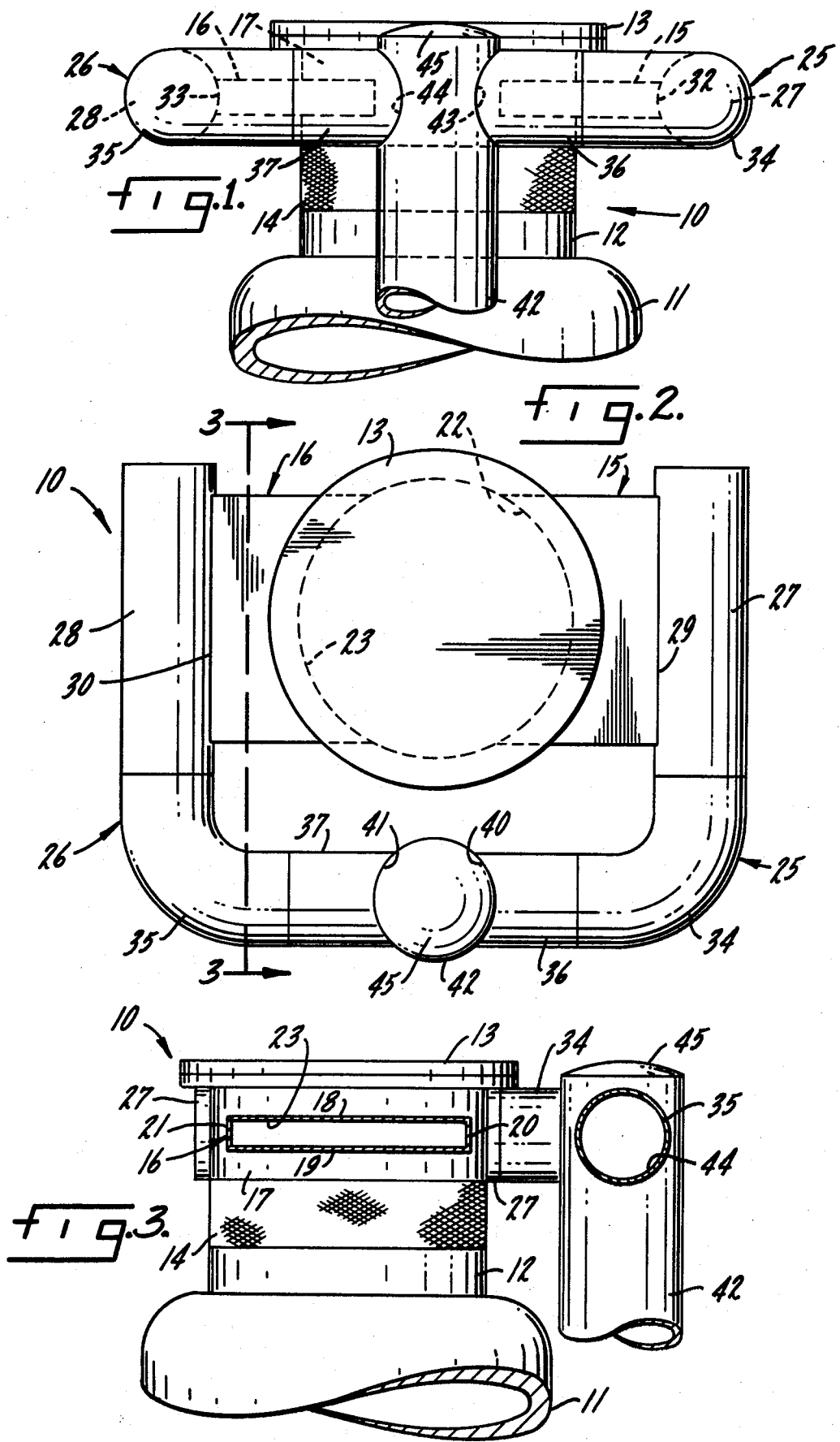

LIQUID-GAS SEPARATION APPARATUS

BACKGROUND OF THE INVENTION

This invention relates to apparatus in which entrained liquid droplets are removed from a stream of gas, and more particularly to an improved gas outlet for the upper portion of a liquid-gas separator vessel of the type disclosed in U.S. application for Letters Patent Ser. No. 710,945, filed Aug. 2, 1976, and assigned to the same assignee as this invention.

The efficiency of a separator that removes liquid droplets from a flowing gas is a critical limitation in systems which continuously concentrate a liquid by evaporation and subsequently decontaminate the resulting vapors to produce pure distillate. Such efficiency is especially critical when aqueous radioactive waste is being concentrated, since decontamination factors in the order of magnitude of $10^6$ are required. The flow patterns of the vapors entering and leaving such separators significantly effect their efficiency. Prior art separators have not been able to achieve optimum results because of uneven flow and vapor distributions therein. Also, when the separator vessel is the highest component in a system, the vertical head room required should be minimized.

SUMMARY OF THE INVENTION

Accordingly, it is an object of this invention to provide improved apparatus for removing entrained liquid droplets from a flowing gas stream.

Another object is to evenly distribute the gas flowing through an entrained liquid separator.

Another object is to eliminate short circuiting of gas flowing through such a separator.

Another object is to reduce the height of liquid-gas separation apparatus.

Another object is to eliminate conical transition pieces from the conduits through which gas leaves such apparatus.

Another object is to promote uniform, non-turbulent flow through a mesh pad liquid separator.

Another object is to provide a gas outlet conduit for a liquid separator that is easy to layout, fabricate, and weld.

Another object is to provide a liquid-gas separation vessel with gas outlet conduits that promote optimum gas flow, are low cost, durable, and simple to maintain, and that do not possess defects found in similar prior art apparatus.

Other objects and advantages of the invention will be revealed in the specification and claims, and the scope of the invention will be set forth in the claims.

DESCRIPTION OF THE DRAWING

FIG. 1 is a partially broken away side elevation of gas outlet conduits and a separation vessel in accord with this invention.

FIG. 2 is a top plan view of the apparatus shown in FIG. 1.

FIG. 3 is a cross-sectional view taken along the line 3—3 in FIG. 2.

DESCRIPTION OF THE INVENTION

The drawing shows apparatus 10 for removing liquid droplets from a gas flowing from the upper portion of an evaporator vessel 11 in a system for concentrating and disposing of aqueous radioactive waste of the type disclosed in the aforementioned application for U.S. Letters Patent. An enclosure 12 shaped like a right circular cylinder with a vertical central axis is welded to the top at the center of evaporator 11. A removable lid 13 connected by conventional means, such as nuts and bolts, seals the top of enclosure 12. One or more liquid-gas separator pads 14 completely span the interior of enclosure 12 in a horizontal plane. Each such pad 14 comprises one or more layers of corrosion resistant interwoven wire mesh material. As gas and entrained liquid droplets flow through pad 14, the liquid droplets are removed by the impingment and coalescing principle. For pad 14 to operate at optimum efficiency, it is necessary for the gas and entrained droplets to flow evenly therethrough in a non-turbulent manner, and for such flow to be distributed evenly over the entire surface of the pad.

Gas flow patterns that promote optimum separator efficiency may be achieved with a gas discharge arrangement as disclosed herein. A pair of essentially identical gas outlet conduits 15 and 16 extend outwardly from opposite surfaces of enclosure 12 in the same horizontal plane, which is located half way up the treated gas chamber 17 above separator pad 14. Conduits 15 and 16 have uniform rectangular vertical cross sections, and the horizontal sides 18 and 19 of the rectangle defined by such a cross section are at least four, and preferably eight times longer than the vertical sides 20 and 21. This enables the generally rectangular gas outlet openings 22 and 23 defined by the intersection of one end of conduits 15 and 16 with enclosure 12 to extend more than 90° around the circumference of the enclosure. Preferably, each opening 22 and 23 extends for at least 120° around such circumference.

A pair of essentially identical gas transfer pipes 25 and 26 receive the gas flowing out of conduits 15 and 16. Each such pipe has a first end portion 27 or 28 shaped like a right circular cylinder with a horizontal central axis. Cylindrical portions 27 and 28 intersect the other or outer ends 29 and 30 of conduits 15 and 16 so as to define a generally rectangular gas transfer opening 32 or 33 in each gas transfer pipe. The diameter of first end portions 27 and 28 is approximately equal to the height of chamber 17 extending above the upper surface of separator pad 14. Right angle or 90° curved elbow portions 34 and 35 connect first cylindrical portions 27 and 28 to second right circular cylindrical portions 36 and 37, respectfully. The diameters of portions 34, 35, 36 and 37 are the same as the diameters of portions 27 and 28, and all such pipe portions have horizontal central axis.

The terminal ends 40 and 41 of second pipe portions 36 and 37 intersect opposite surfaces of a gas header 42. Header 42 is shaped like a right circular cylinder with a vertical central axis, and has a diameter greater than the diameter of pipes 25 and 26. The intersection of header 42 and portions 36 and 37 defines opposed circular gas entry openings 43 and 44. The upper surface 45 of header 42 does not extend above the top of enclosure 12.

The relative shape, size, and location of openings 22 and 23, conduits 15 and 16, pipes 25 and 26, and header 42 determine the flow pattern of gas and liquid droplets passing upwardly out of evaporator 11. Such flow is distributed evenly over the entire cross sectional area of separator 14, and the gas flows through the separator in a uniform non-turbulent manner into chamber 17 in enclosure 12 thereabove. The gas then flows through relatively wide, narrow openings 22 and 23, which are centered in chamber 17 and thence through pipes 25 and 26 into opposite sides of header 42. From header 42 the liquid-free gas is processed further or disposed of.

It has thus been shown that by the practice of this invention a liquid-gas separator of an evaporator can operate at optimum efficiency because a pair of rectangular gas conduits 15 and 16 produce the most desirable gas flow patterns in cylindrical separator enclosure 12. The entire structure is economical and easy to fabricate because of the regular geometric shapes employed. Also, the pumping pressure and head room requirements are minimized.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for removing liquid droplets entrained in a gas stream comprising:
   (a) a sealed enclosure in the shape of a right circular cylinder with a vertical central axis and having an inlet opening,
   (b) a mesh pad liquid droplet separator spanning said enclosure in a horizontal plane,
   (c) a pair of essentially identical gas outlet conduits located above said separator and extending outwardly from opposite surfaces of said enclosure in the same horizontal plane, said conduits each having a uniform rectangular vertical cross section, the intersection of one end of each conduit with said enclosure defining a generally rectangular gas outlet opening extending from between 90° and 180° around the circumference of said enclosure, the horizontal sides of said rectangular cross section of each conduit being at least four times longer than its vertical sides,
   (d) a pair of essentially identical gas transfer pipes each having a right circular cylindrical portion with its central axis horizontal, said cylindrical portion of each said pipes intersecting the other end of one of said conduits so as to define a generally rectangular gas transfer opening in each pipe, and
   (e) a gas header connected to a terminal end of each of said pipes, whereby, said gas flows uniformly through said separator.

2. The invention defined in claim 1 further comprising each of said rectangular gas outlet openings extending for at least 120° around the circumference of said enclosure.

3. The invention defined in claim 1 further comprising the diameter of said cylindrical portion of each transfer pipe being approximately equal to the height of said enclosure extending above said separator.

4. The invention defined in claim 1 further comprising said header extending no higher than the top of said enclosure.

5. The invention defined in claim 1 further comprising said header having the shape of a right circular cylinder with a vertical central axis, and the intersection of said header and the terminal end of each of said pipes defining opposed circular openings for entry of said gas into said header.

6. Apparatus for removing liquid droplets entrained in a gas stream comprising:
   (a) a sealed enclosure in the shape of a right circular cylinder with a vertical central axis and having an inlet opening,
   (b) a mesh pad liquid droplet separator spanning said enclosure in a horizontal plane,
   (c) a pair of essentially identical gas outlet conduits located above said separator extending outwardly from opposite surfaces of said enclosure in the same horizontal plane, said conduits each having a uniform rectangular vertical cross section, the horizontal sides of said rectangular cross section of each conduit being at least four times longer than its vertical sides, the intersection of one end of each conduit with said enclosure defining a generally rectangular gas outlet opening extending from between 120° and 180° around the circumference of said enclosure,
   (d) a pair of essentially identical gas transfer pipes each having a right circular cylindrical portion with its central axis horizontal, the diameter of each cylindrical portion being approximately equal to the height of said enclosure extending above said separator, said cylindrical portion of each of said pipes intersecting the other end of one of said conduits so as to define a generally rectangular gas transfer opening in each pipe, and
   (e) a gas header in the shape of a right circular cylinder with a vertical axis, a terminal end of each of said pipes intersecting said header so as to define opposed circular openings for entry of said gas into said header, said cylindrical header extending no higher than the top of said enclosure, and the diameter of said header being greater than the diameter of said pipes, whereby, said gas flows uniformly through said separator.

7. The invention defined in claim 6 further comprising a 90° elbow portion connecting said cylindrical portion of each of said pipes to a second right circular cylindrical portion of each of said pipes which intersects said header.

* * * * *